United States Patent [19]

Davies

[11] 4,301,213

[45] Nov. 17, 1981

[54] STEEL BACKING BEARING BLANK WITH BONDED CERAMIC LAYER, COATING OF POLYARYLENE SULPHIDE THEREON AND METHOD OF MAKING

[75] Inventor: Glyndwr J. Davies, Southall, England

[73] Assignee: The Glacier Metal Co., Ltd., Middlesex, England

[21] Appl. No.: 165,123

[22] PCT Filed: Feb. 8, 1979

[86] PCT No.: PCT/GB79/00025

§ 371 Date: Nov. 6, 1979

§ 102(e) Date: Nov. 6, 1979

[87] PCT Pub. No.: WO79/00716

PCT Pub. Date: Oct. 4, 1979

[30] Foreign Application Priority Data

Mar. 6, 1978 [GB] United Kingdom ................. 8824/78

[51] Int. Cl.$^3$ ...................... B32B 27/28; B32B 15/18; B32B 27/08
[52] U.S. Cl. .................................. 428/419; 428/472; 428/406; 427/191; 427/192; 427/193; 427/203; 427/204; 427/205; 308/DIG. 8; 308/DIG. 9; 308/241
[58] Field of Search ............... 428/405, 406, 419, 472; 427/191-193, 203-205

[56] References Cited

U.S. PATENT DOCUMENTS

| | | | |
|---|---|---|---|
| 3,514,319 | 5/1970 | Hata et al. | 428/472 X |
| 3,540,896 | 11/1970 | Flicker | 428/472 X |
| 3,975,165 | 8/1976 | Elbert et al. | 428/472 X |
| 4,036,822 | 7/1977 | Patel et al. | 428/419 X |
| 4,086,376 | 4/1978 | Davies | 428/419 X |
| 4,212,922 | 7/1980 | Tieszen | 428/419 |

FOREIGN PATENT DOCUMENTS

| | | |
|---|---|---|
| 427793 | 5/1972 | Australia . |
| 2103727 | 4/1972 | France . |
| 1356174 | 6/1974 | United Kingdom . |
| 1475295 | 6/1977 | United Kingdom . |

*Primary Examiner*—P. Ives
*Attorney, Agent, or Firm*—Oblon, Fisher, Spivak, McClelland & Maier

[57] ABSTRACT

The present invention relates to bonding a coating of polyarylene sulphide, for example polyphenylene sulphide, to a steel backing by the use of a ceramic or other non-metallic inter-layer or bonding layer. In some cases the bonding layer comprises a layer of fine particles bonded to the backing followed by a layer of coarser particles to which the coating can be more effectively bonded. This results on a coated steel backing capable of being deformed without the coating becoming detached. Such a coated backing is suitable for use as a bearing material, a chemically resistant material or as cookware.

16 Claims, No Drawings

STEEL BACKING BEARING BLANK WITH BONDED CERAMIC LAYER, COATING OF POLYARYLENE SULPHIDE THEREON AND METHOD OF MAKING

This invention relates to the application to a steel backing of a coating of polyphenylene sulphide or of some other polyarylene sulphide resin polymers.

It is known that polyphenylene sulphide is a satisfactory coating for metal backings, for providing a good plain bearing surface, or a surface resistent to chemical attack, or a good non-stick surface, for example for use with cookware, but although polyphenylene sulphide can be satisfactorily bonded to aluminium, it is difficult to bond polyphenylene sulphide successfully to steel, and there are many applications where a steel surface could well be coated with polyphenylene sulphide.

In British Patent Specification No. 1,475,295, the method has been described for applying a polyphenylene sulphide coating to a steel backing by using either an intermediate aluminium foil, or a sintered metal powder substrate between the steel and the polyphenylene sulphide.

One object of the present invention is to provide a method of bonding polyarylene sulphide for example polyphenylene sulphide to a steel backing which is particularly effective and may indeed enable a sheet steel backing to be deformed in the manufacture of engineer components, without the polyarylene sulphide layer becoming detached.

According to one aspect of the present invention, there is provided a steel backing having a coating of polyphenylene sulphide or some other polyarylene sulphide, characterized in that the coating is bonded to a bonding layer of non-metallic material bonded to the backing.

Preferably the bonding layer is ceramic in nature and may consist of a slip, glaze, or frit, or other form of vitreous coating, and the coating is preferably polyphenylene sulphide. Preferred constituents of the bonding layer are silicon oxide, boron oxide, and sodium oxide, and it is also possible to include oxides of cobalt, nickel manganese and aluminium, and calcium fluoride which latter compounds assist in obtaining a good bond between the bonding layer and the steel.

A preferred range of weights of silicon oxide is from 30-70% and of boron oxide 10-40% and sodium oxide 5-15% while it is preferred that there is not more then 5% of any of the other compounds.

It is important that the frit layer is continuous so that chemical compounds formed during curing of the polyphenylene sulphide to the ceramic layer do not reach the steel to damage the steel or to break down the bond between the bonding layer and the steel.

The ceramic layer may consist of a mixture of fine frit particles, and coarse frit particles, the purpose of the fine particles being to ensure the continuity of the layer while the purpose of the coarse particles is to provide a surface to which the polyphenylene sulphide can be effectively keyed.

The fine and coarse particles can be applied together, either in a common slurry, or in a mixture of a powder which is applied, for example by spraying, but in one method which is preferred in some circumstances, a ceramic layer consisting of fine frit particles is applied, sintered and bonded to the steel first, and then an outer layer of coarse frit particles is applied, sintered and bonded to the continuous fine layer to provide a surface very suitable for receiving the polyphenylene sulphide layer.

The fine layer will in general have a lower viscosity and lower melting temperature than the coarser layer.

It is advantageous if both layers have such a formula that they have the same co-efficient of thermal expansion as the steel backing.

According to another aspect of the invention a method of coating a steel surface comprises bonding a ceramic or other non-metallic bonding layer to the backing and bonding a coating of polyphenylene sulphide or some other polyarylene sulphide to the bonding layer.

As suggested above, the ceramic layer may be applied in two stages, a layer of fine frit particles being followed by a layer of coarse frit particles.

The fine particles are conveniently with dimensions less than $10^{-5}$ m, while the coarse particles have dimensions greater than that, and are possibly in the range $5.10^{-5}$ m to $2.10^{-4}$ m. Preferred ranges of the particles in the coarse layer are between 20-70% by weight of silicon oxide, between 5-15% by weight of boron oxide, between 5-15% by weight of sodium oxide, and between 5-15% by weight of zirconium oxide. The zirconium oxide has the effect of making the second layer thicker, rougher and more porous that it would be without the zirconium oxide.

Preferred ranges of additions to assist the bond to the polyphenylene sulphide are 2-10% by weight of nickel sulphide, 2-10% by weight of chromium sulphide, 2-10% by weight of selenium oxide, and 2-10% by weight of tellurium oxide.

The invention may be carried into practice in various ways, and certain embodiments will now be described by way of example.

EXAMPLE 1

The surface of a sheet of steel was degreased and linished, and then a slurry was sprayed onto it. The slurry consisted of a suspension in water of a mixture of equal parts by weight of a fine frit and a coarse frit. The maximum dimension of the fine frit was $10^{-5}$ m whereas the coarse frit had dimensions between $5.10^{-5}$ to $2.10^{-4}$ m. The fine frit consisted of 50 parts by weight of $SiO_2$, 28 parts of $B_2O_3$ and 10 parts of $Na_2O$ together with a steel bonding agent, for example CoO, NiO, $Mn_2O_3$, $Al_2O_3$ or $CaF_2$. The coarse frit consisted of 50 parts by weight of $SiO_2$, 20 parts of $B_2O_3$, and 20 parts of $Na_2O$, together with 10 parts of a coarsening agent $ZrO_2$.

The steel was heated to between 850°-900° C. by an induction heating method, to evaporate off the water carrier and sinter the frit into a ceramic coating firmly bonded to the steel, but with a coarse surface. Finally polyphenylene sulphide powder was applied to the coarse frit surface, and was melted so that it ran and filled and was keyed to the frit surface leaving a smooth exposed surface, and heating was continued until the polyphenylene sulphide was cured.

In a particular method, the steel bonding agent included with the frit mixture consisted of 2 parts of CoO, 2 parts of NiO, 2 parts of $Mn_2O_3$, 2 parts of $Al_2O_3$, and 2 parts of $CaF_2$.

EXAMPLE 2

This was the same as EXAMPLE 1, except that the coarse frit consisted of 50 parts of $SiO_2$, 10 parts of $B_2O_3$, 10 parts of $Na_2O$, and 10 parts of $ZrO_2$. Also to improve the bond between the frit and the polyphenylene sulphide, the mixture included 5 parts of $Cr_2S_3$, 5 parts of NiS, 5 parts of $SeO_2$, and 5 parts of $TeO_2$.

EXAMPLE 3

Sheet steel surface was degreased and linished as with EXAMPLES 1 and 2, and then the fine frit layer was applied to the steel in a slurry and heated to be sintered and to be bonded to the steel. Then the coarse frit was applied separately in a slurry to the sintered layer of fine frit, and finally the polyphenylene sulphide was applied to the sintered coarse frit.

EXAMPLE 4

In this case the steel was prepared in the same way, and the fine frit and the coarse frit were applied separately, but they were not applied in a water slurry, but as dry powders sprayed on. The sintering and bonding step was performed as in the previous examples.

The examples can be varied, and for some purposes it is advantageous to copper-plate the steel surface before the application of the frit.

The PPS can be painted on in a carrier, or can be dusted on as a powder, or can be sprayed on. Curing to bond the PPS to the coarse frit will be performed in each case.

Where the fine and coarse frits are applied separately, it may be necessary to use a higher sintering temperature for the coarse frit.

I claim:

1. A steel backing having a coating of polyarylene sulphide wherein the coating is bonded to a ceramic bonding layer, comprising silicon oxide, boron oxide and sodium oxide, which is bonded to the backing.

2. The coated steel backing according to claim 1, wherein the polyarylene sulphide is polyphenylene sulphide.

3. A bearing blank formed from a coated steel backing as claimed in claim 1 or 2.

4. The coated steel backing according to claim 1 or 2, wherein the bonding layer is sintered to the backing.

5. A bearing blank formed from a coated steel backing as claimed in claim 4.

6. The coated steel backing according to claim 4, wherein the bonding layer comprises fine particles of a diameter less than $10^{-5}$ m bonded to the backing and coarse particles of a diameter of $5 \times 10^{-5}$ to $2 \times 10^{-4}$ m bonded to the coating.

7. A bearing blank formed from a coated steel backing as claimed in claim 6.

8. A method of coating a steel backing comprising: bonding a ceramic bonding layer comprising silicon oxide, boron oxide and sodium oxide to the backing, and bonding a coating of polyarylene sulphide to the bonding layer.

9. The method according to claim 8, wherein the polyarylene sulphide is polyphenylene sulphide.

10. The method according to claim 8, wherein the bonding layer is applied to the backing in two stages, a layer of fine particles of a diameter less than $10^{-5}$ m being followed by a layer of coarse particles of a diameter of $5 \times 10^{-5}$ to $2 \times 10^{-5}$ m.

11. The method according to claim 8 or 10, wherein the bonding layer is sintered to the backing.

12. The method according to claim 10, wherein the fine particles used in the bonding layer comprise: 30 to 70% silicon oxide; 10 to 40% boron oxide; 5 to 15% sodium oxide; and up to 5% each of at least one member selected from the group consisting of cobalt oxide, nickel oxide, manganese oxide, aluminum oxide and calcium fluoride.

13. The method according to claim 10, wherein the coarse particles used in the bonding layer comprise: 20 to 70% silicon oxide; 5 to 15% boron oxide; 5 to 15% sodium oxide; and 5 to 15% zirconium oxide.

14. The method according to claim 13, wherein the coarse particles used in the bonding layer comprise: 20 to 70% silicon oxide; 5 to 15% boron oxide; 5 to 15% sodium oxide; 5 to 15% zirconium oxide; and 2 to 10% each of at least one member selected from the group consisting of nickel sulphide, chromium sulphide, selenium oxide and tellurium oxide.

15. A bearing blank formed from a coated steel backing prepared by the method of claim 8, 9, 10, 12, 13 or 14.

16. A bearing blank formed from a coated steel backing prepared by the method of claim 11.

* * * * *